United States Patent
Roberts

(10) Patent No.: US 9,009,622 B2
(45) Date of Patent: Apr. 14, 2015

(54) MEDIA CONTENT INSTANCE SEARCH METHODS AND SYSTEMS

(75) Inventor: Brian F. Roberts, Dallas, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1263 days.

(21) Appl. No.: 12/495,401

(22) Filed: Jun. 30, 2009

(65) Prior Publication Data

US 2010/0333025 A1 Dec. 30, 2010

(51) Int. Cl.
| | |
|---|---|
| G06F 3/048 | (2013.01) |
| G06F 3/0483 | (2013.01) |
| G06F 3/0481 | (2013.01) |
| G06F 3/0482 | (2013.01) |
| G06F 17/30 | (2006.01) |
| G06F 3/0488 | (2013.01) |

(52) U.S. Cl.
CPC .......... *G06F 3/0483* (2013.01); *G06F 3/04883* (2013.01); *G06F 3/0481* (2013.01); *G06F 3/0482* (2013.01); *G06F 17/30038* (2013.01); *G06F 17/30047* (2013.01); *G06F 17/30796* (2013.01); *G06F 17/30843* (2013.01)

(58) Field of Classification Search
CPC .. G06F 3/0481; G06F 3/0482; G06F 3/04883
USPC .................................. 715/802, 810
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |

(Continued)

OTHER PUBLICATIONS

Screenshot from Apple ITunes application as accessed on Apr. 27, 2009.

*Primary Examiner* — Tuyetlien Tran

(57) ABSTRACT

An exemplary method includes maintaining data representative of a plurality of media content instances, displaying within a graphical user interface a plurality of graphical objects positioned along a viewing axis, each of the graphical objects representing a metadata value within a metadata category associated with the media content instances, shifting a graphical object included within the plurality of graphical objects into a center focus portion of the viewing axis in response to a user input command, and transforming the graphical object from a book end depiction into a cover art depiction when the graphical object enters the center focus portion. Corresponding methods and systems are also disclosed.

21 Claims, 13 Drawing Sheets

(56) References Cited

U.S. PATENT DOCUMENTS

| | | | |
|---|---|---|---|
| 5,640,484 A | 6/1997 | Mankovitz | |
| 5,684,525 A | 11/1997 | Klosterman | |
| 5,701,383 A | 12/1997 | Russo et al. | |
| 5,706,145 A | 1/1998 | Hindman et al. | |
| 5,727,060 A | 3/1998 | Young | |
| 5,734,786 A | 3/1998 | Mankovitz | |
| 5,790,198 A | 8/1998 | Roop et al. | |
| 5,801,787 A | 9/1998 | Schein et al. | |
| 5,808,608 A | 9/1998 | Young et al. | |
| 5,809,204 A | 9/1998 | Young et al. | |
| 5,812,205 A | 9/1998 | Milnes et al. | |
| 5,828,945 A | 10/1998 | Klosterman | |
| 5,870,150 A | 2/1999 | Yuen | |
| 5,886,746 A | 3/1999 | Yuen et al. | |
| 5,915,026 A | 6/1999 | Mankovitz | |
| 5,923,362 A | 7/1999 | Klosterman | |
| 5,940,073 A | 8/1999 | Klosterman et al. | |
| 5,949,954 A | 9/1999 | Young et al. | |
| 5,959,688 A | 9/1999 | Schein et al. | |
| 5,969,748 A | 10/1999 | Casement et al. | |
| 5,970,206 A | 10/1999 | Yuen et al. | |
| 5,974,222 A | 10/1999 | Yuen et al. | |
| 5,987,213 A | 11/1999 | Mankovitz et al. | |
| 5,988,078 A | 11/1999 | Levine | |
| 5,991,498 A | 11/1999 | Young | |
| 6,002,394 A | 12/1999 | Schein et al. | |
| 6,016,141 A | 1/2000 | Knudson et al. | |
| 6,028,599 A | 2/2000 | Yuen et al. | |
| 6,049,652 A | 4/2000 | Yuen et al. | |
| 6,052,145 A | 4/2000 | Macrae et al. | |
| 6,072,983 A | 6/2000 | Klosterman | |
| 6,075,551 A | 6/2000 | Berezowski et al. | |
| 6,075,575 A | 6/2000 | Schein et al. | |
| 6,078,348 A | 6/2000 | Klosterman et al. | |
| 6,091,882 A | 7/2000 | Yuen et al. | |
| 6,118,492 A | 9/2000 | Milnes et al. | |
| 6,133,909 A | 10/2000 | Schein et al. | |
| 6,137,950 A | 10/2000 | Yuen | |
| 6,144,401 A | 11/2000 | Casement et al. | |
| 6,151,059 A | 11/2000 | Schein et al. | |
| 6,167,188 A | 12/2000 | Young et al. | |
| 6,177,931 B1 | 1/2001 | Alexander et al. | |
| 6,216,265 B1 | 4/2001 | Roop et al. | |
| 6,239,794 B1 | 5/2001 | Yuen et al. | |
| 6,247,176 B1 | 6/2001 | Schein et al. | |
| 6,262,722 B1 | 7/2001 | Allison et al. | |
| 6,263,501 B1 | 7/2001 | Schein et al. | |
| 6,323,911 B1 | 11/2001 | Schein et al. | |
| 6,341,195 B1 | 1/2002 | Mankovitz et al. | |
| 6,341,374 B2 | 1/2002 | Schein et al. | |
| 6,388,714 B1 | 5/2002 | Schein et al. | |
| 6,396,546 B1 | 5/2002 | Alten et al. | |
| 6,412,110 B1 | 6/2002 | Schein et al. | |
| 6,430,358 B1 | 8/2002 | Yuen et al. | |
| 6,430,359 B1 | 8/2002 | Yuen et al. | |
| 6,453,471 B1 | 9/2002 | Klosterman | |
| 6,460,181 B1 | 10/2002 | Donnelly | |
| 6,466,734 B2 | 10/2002 | Yuen et al. | |
| 6,469,753 B1 | 10/2002 | Klosterman et al. | |
| 6,477,705 B1 | 11/2002 | Yuen et al. | |
| 6,498,895 B2 | 12/2002 | Young et al. | |
| 6,505,348 B1 | 1/2003 | Knowles et al. | |
| 6,538,701 B1 | 3/2003 | Yuen | |
| 6,549,719 B2 | 4/2003 | Mankovitz | |
| 6,564,379 B1 | 5/2003 | Knudson et al. | |
| 6,567,606 B2 | 5/2003 | Milnes et al. | |
| 6,588,013 B1 | 7/2003 | Lumley et al. | |
| 6,668,133 B2 | 12/2003 | Yuen et al. | |
| 6,687,906 B1 | 2/2004 | Yuen et al. | |
| 6,725,427 B2 * | 4/2004 | Freeman et al. | 715/273 |
| 6,732,369 B1 | 5/2004 | Schein et al. | |
| 6,742,183 B1 | 5/2004 | Reynolds et al. | |
| 6,745,391 B1 | 6/2004 | Macrae et al. | |
| 6,756,997 B1 | 6/2004 | Ward et al. | |
| 6,760,537 B2 | 7/2004 | Mankovitz | |
| 6,799,326 B2 | 9/2004 | Boylan et al. | |
| 6,799,327 B1 | 9/2004 | Reynolds et al. | |
| 6,850,693 B2 | 2/2005 | Young et al. | |
| 6,859,799 B1 | 2/2005 | Yuen | |
| 7,039,935 B2 | 5/2006 | Knudson et al. | |
| 7,069,576 B1 | 6/2006 | Knudson et al. | |
| 7,383,503 B2 * | 6/2008 | Banks | 715/273 |
| 7,487,529 B1 | 2/2009 | Orlick | |
| 2001/0029610 A1 | 10/2001 | Corvin et al. | |
| 2001/0047298 A1 | 11/2001 | Moore et al. | |
| 2001/0054181 A1 | 12/2001 | Corvin | |
| 2002/0073424 A1 | 6/2002 | Ward et al. | |
| 2002/0124255 A1 | 9/2002 | Reichardt et al. | |
| 2003/0005445 A1 | 1/2003 | Schein et al. | |
| 2003/0056219 A1 | 3/2003 | Reichardt et al. | |
| 2003/0110495 A1 | 6/2003 | Bennington et al. | |
| 2003/0110499 A1 | 6/2003 | Knudson et al. | |
| 2003/0115599 A1 | 6/2003 | Bennington et al. | |
| 2003/0115602 A1 | 6/2003 | Knee et al. | |
| 2003/0128228 A1 * | 7/2003 | Crow et al. | 345/716 |
| 2003/0163813 A1 | 8/2003 | Klosterman et al. | |
| 2003/0164858 A1 | 9/2003 | Klosterman et al. | |
| 2003/0188310 A1 | 10/2003 | Klosterman et al. | |
| 2003/0188311 A1 | 10/2003 | Yuen et al. | |
| 2003/0196201 A1 | 10/2003 | Schein et al. | |
| 2003/0204847 A1 | 10/2003 | Ellis et al. | |
| 2003/0208756 A1 | 11/2003 | Macrae et al. | |
| 2003/0218637 A1 * | 11/2003 | Sloo et al. | 345/810 |
| 2004/0010806 A1 | 1/2004 | Yuen et al. | |
| 2004/0045025 A1 | 3/2004 | Ward et al. | |
| 2004/0100479 A1 * | 5/2004 | Nakano et al. | 345/700 |
| 2004/0107437 A1 | 6/2004 | Reichardt et al. | |
| 2004/0168189 A1 | 8/2004 | Reynolds et al. | |
| 2004/0194138 A1 | 9/2004 | Boylan et al. | |
| 2004/0261098 A1 | 12/2004 | Macrae et al. | |
| 2005/0010949 A1 | 1/2005 | Ward et al. | |
| 2005/0028201 A1 | 2/2005 | Klosterman et al. | |
| 2005/0091596 A1 * | 4/2005 | Anthony et al. | 715/712 |
| 2005/0125823 A1 | 6/2005 | McCoy et al. | |
| 2005/0149964 A1 | 7/2005 | Thomas et al. | |
| 2005/0155056 A1 | 7/2005 | Knee et al. | |
| 2005/0160375 A1 * | 7/2005 | Sciammarella et al. | 715/838 |
| 2005/0192924 A1 * | 9/2005 | Drucker et al. | 707/1 |
| 2005/0210410 A1 * | 9/2005 | Ohwa et al. | 715/821 |
| 2005/0216936 A1 | 9/2005 | Knudson et al. | |
| 2005/0251824 A1 | 11/2005 | Thomas et al. | |
| 2005/0278656 A1 * | 12/2005 | Goldthwaite et al. | 715/810 |
| 2006/0156336 A1 | 7/2006 | Knudson et al. | |
| 2006/0212894 A1 | 9/2006 | Knudson et al. | |
| 2006/0277574 A1 | 12/2006 | Schein et al. | |
| 2006/0288366 A1 | 12/2006 | Boylan et al. | |
| 2007/0016926 A1 | 1/2007 | Ward et al. | |
| 2007/0033613 A1 | 2/2007 | Ward et al. | |
| 2007/0107010 A1 | 5/2007 | Jolna et al. | |
| 2007/0162853 A1 * | 7/2007 | Weber et al. | 715/719 |
| 2007/0204238 A1 * | 8/2007 | Hua et al. | 715/838 |
| 2008/0062141 A1 * | 3/2008 | Chandhri | 345/173 |
| 2008/0066013 A1 * | 3/2008 | Brodersen et al. | 715/836 |
| 2008/0066016 A1 * | 3/2008 | Dowdy et al. | 715/854 |
| 2008/0122870 A1 | 5/2008 | Brodersen et al. | 345/634 |
| 2009/0002335 A1 * | 1/2009 | Chaudhri | 345/173 |
| 2009/0327891 A1 * | 12/2009 | Holm et al. | 715/716 |
| 2010/0175026 A1 * | 7/2010 | Bortner et al. | 715/818 |

* cited by examiner

illegible …

MEDIA CONTENT INSTANCE SEARCH METHODS AND SYSTEMS

BACKGROUND INFORMATION

Advances in electronic communications technologies have interconnected people and allowed for distribution of information perhaps better than ever before. To illustrate, set-top boxes, personal computers, handheld devices, mobile phones, and other electronic devices are increasingly being used to access, store, download, share, and/or otherwise process various types of media content (e.g., video, audio, photographs, and/or multimedia).

Increased electronic storage capacities have allowed many users to amass large electronic libraries of media content. For example, many electronic devices are capable of storing thousands of audio, video, image, and other media content files.

A common problem associated with such large electronic libraries of media content is searching for and retrieving desired media content within the library. Text searching techniques (e.g., title searches) are often used. In certain cases, however, textual searches and other conventional techniques for searching for media content are cumbersome, difficult to use, impractical, and time consuming.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
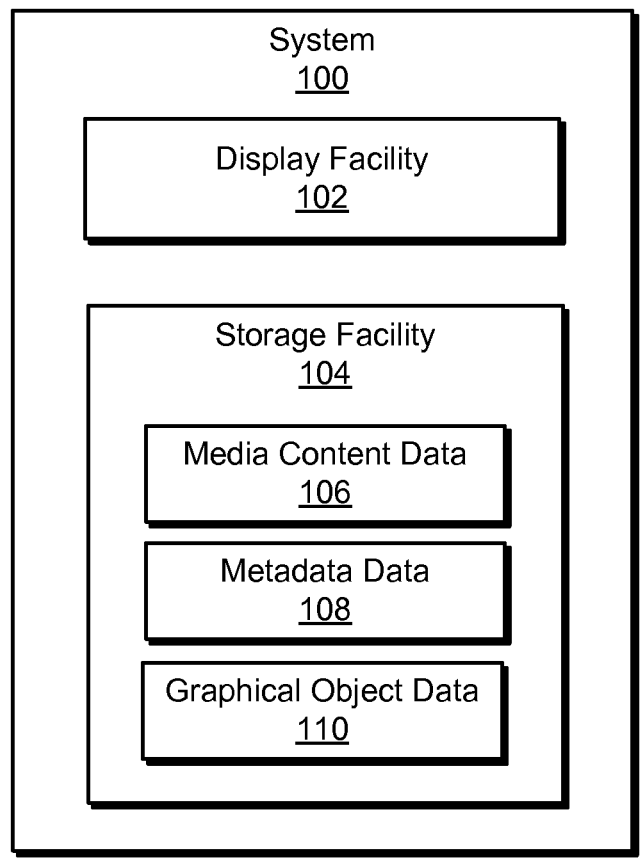
FIG. 1 illustrates an exemplary media content access system according to principles described herein.

Exemplary media content instance search methods and systems are disclosed herein. As described in more detail below, a display facility may be selectively and communicatively coupled to a storage facility. The storage facility may be configured to maintain data representative of a plurality of media content instances. The display facility may be configured to display within a graphical user interface a plurality of graphical objects positioned along a viewing axis, which includes a center focus portion disposed in between first and second peripheral portions. Each graphical object positioned along the viewing axis represents a metadata value within a metadata category associated with the plurality of media content instances. For example, each graphical object may represent a title of a movie within a collection of movies available for access by the user.

In some examples, the display facility is configured to depict a subset of the graphical objects located within the peripheral portions of the viewing axis as book ends and another subset of the graphical objects located within the center focus portion of the viewing axis as cover art. As used herein, a graphical object depicted as a "book end" includes a generally rectangular object with content displayed therein such that the graphical object is visually similar to a spine or end of a book, CD case, DVD case, or other media content housing. A graphical object depicted as "cover art" includes content displayed therein that is visually similar to content (e.g., cover art) displayed on a cover of a book, CD case, DVD case, or other media content housing. As will be described in more detail below, depicting graphical objects located within the center focus portion of the viewing axis as cover art and the graphical objects located within the peripheral portions as book ends, the peripheral viewing capabilities of a user may be more effectively utilized.

As used herein, "media content" may refer generally to any content accessible via a media content access subsystem. The term "media content instance" refers to any data record or object (e.g., an electronic file) storing, including, or otherwise associated with media content, which may include data representative of a song, audio clip, movie, video, image, photograph, text, document, application file, or any segment, component, or combination of these or other forms of content that may be experienced or otherwise accessed by a user. A media content instance may have any data format as may serve a particular application. For example, a media content instance may include an audio file having an MP3, WAV, AIFF, AU, or other suitable format, a video file having an MPEG, MPEG-2, MPEG-4, MOV, DMF, or other suitable format, an image file having a JPEG, BMP, TIFF, RAW, PNG, GIF or other suitable format, and/or a data file having any other suitable format.

The term "metadata" as used herein refers generally to any electronic data descriptive of content and/or media content instances. Hence, metadata may include, but is not limited to, time data, physical location data, user data, source data, destination data, size data, creation data, modification data, access data (e.g., play counts), and/or any other data descriptive of content and/or one or more media content instances. For example, metadata corresponding to a song may include a title of the song, a name of the song's artist or composer, a name of the song's album, a genre of the song, a length of the song, one or more graphics corresponding to the song (e.g., album art), and/or any other information corresponding to the song as may serve a particular application. Metadata corresponding to a video may include a title of the video, a name of one or more people associated with the video (e.g., actors, producers, creators, etc.), a rating of the video, a synopsis of the video, and/or any other information corresponding to the video as may serve a particular application. Metadata corresponding to other types of media content instances may include additional or alternative information.

The term "metadata category" (or simply "category") as used herein refers to a particular type of metadata associated with a plurality of media content instances. To illustrate, a metadata category may include a media content instance title category, album title category, genre category, artist category, and/or any other category associated with a plurality of media content instances. Additional or alternative metadata categories may be associated with a plurality of media content instances as may serve a particular application. One or more "metadata values" may be included within each metadata category. For example, metadata values within an artist category may include names of individual artists within the artist category.

FIG. 1 illustrates an exemplary media content access system 100 (or simply "system 100"). As will be described in more detail below, system 100 may be configured to facilitate access by one or more users to one or more media content instances.

System 100 may include, but is not limited to, a display facility 102 and a storage facility 104. As will be described in more detail below, display facility 102 may be configured to display a plurality of graphical objects within a graphical user interface. Each graphical object may represent a metadata value within a metadata category associated with a plurality of media content instances. For example, each graphical object may represent a title of a movie within a collection of movies available to a user of system 100. Other metadata values and metadata categories will be described in more detail below.

In some examples, display facility 102 may be configured to position the graphical objects along a viewing axis that comprises a center focus portion positioned between first and second peripheral portions. A subset of the graphical objects may be located within the center focus portion and a subset of the graphical objects may be located with the peripheral portions. As will be described in more detail below, each of the graphical objects located within the center focus portion of the viewing axis may be depicted as cover art (e.g., any combination of images and/or text displayed on the cover of a book, DVD case, CD case, etc.) while each of the graphical objects located within the peripheral portions of the viewing axis may be depicted as a book end (e.g., the text displayed along the spine of a book, DVD case, CD case, etc.).

In some examples, a user may transmit one or more user input commands to display facility 102 to shift the graphical objects along the viewing axis in order to browse through a list of media content instances available via system 100. As the graphical objects are shifted along the viewing axis, one or more of the graphical objects may enter the center focus portion. In some examples, display facility 102 may be configured to transform these graphical objects from book end depictions to cover art depictions as they enter the center focus portion. Likewise, as the graphical objects are shifted along the viewing axis, one or more of the graphical objects may exit the center focus portion and enter one of the peripheral portions. In some examples, display facility 102 may be configured to transform these graphical objects from cover art depictions to book end depictions as they enter the peripheral portions.

In this manner, as will be described in more detail below, a user may locate and/or access a particular media content instance available via system 100 by scrolling through a plurality of graphical objects until a graphical object corresponding to the particular media content instance is located within the center focus portion of the viewing axis. The user may then select the graphical object to access the media content instance, one or more options associated with the media content instance, and/or one or more subcategories associated with the media content instance. By depicting graphical objects as cover art when within the center focus portion and as book ends when within the peripheral portions, the peripheral viewing capabilities of a user may be more effectively utilized.

As shown in FIG. 1, storage facility 104 may be configured to maintain media content data 106 representative of one or more media content instances, metadata data 108 representative of one or more metadata values and/or categories, and graphical object data 110 representative of one or more graphical objects. Data 106-110 will be described in more detail below.

System 100, including display facility 102 and storage facility 104, may include any computer hardware and/or computer-implemented instructions (e.g., software), or combinations of computer-implemented instructions and hardware, configured to perform one or more of the processes described herein. In particular, system 100 may be implemented on one physical computing device or may be implemented on more than one physical computing device. Accordingly, system 100 may include any number of computing devices, and may employ any of a number of computer operating systems.

One or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
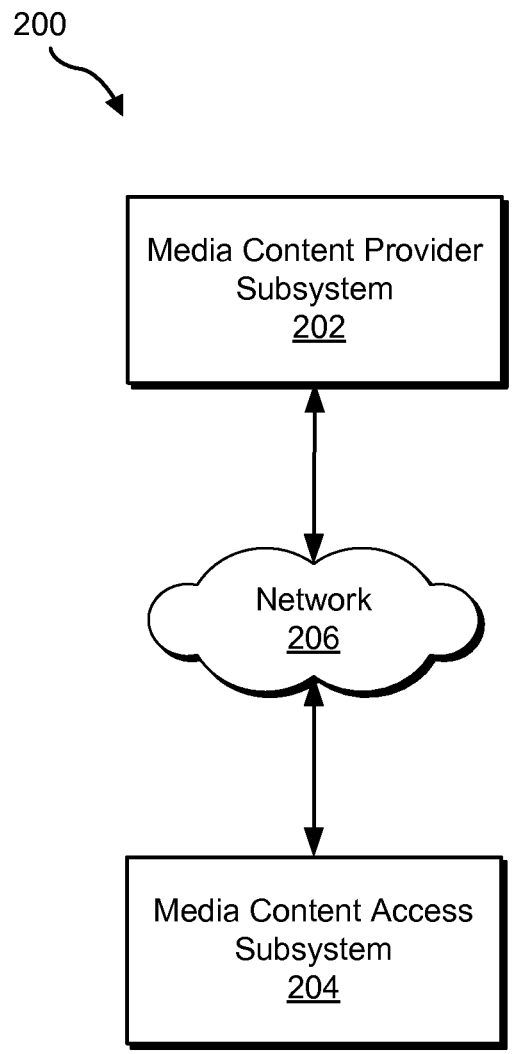
FIG. 2 illustrates an exemplary implementation of the system of FIG. 1 according to principles described herein.

FIG. 2 illustrates an exemplary implementation 200 of system 100 wherein a media content provider subsystem 202 (or simply "provider subsystem 202") is communicatively coupled to a media content access subsystem 204 (or simply "access subsystem 204"). As will be described in more detail below, display facility 102 and storage facility 104 may each be implemented on one or both of provider subsystem 202 and access subsystem 204.

Access subsystem 204 may be configured to communicate with and receive a signal and/or data stream containing data representative of media content and/or data associated with media content (e.g., metadata, etc.) from provider subsystem 202. Access subsystem 204 and provider subsystem 202 may communicate using any suitable communication technologies, devices, networks, network platforms, media, and protocols supportive of remote data communications.

For example, as shown in FIG. 2, provider subsystem 202 may be configured to communicate with access subsystem 204 over a network 206 (and communications links thereto). Network 206 may include one or more networks or types of networks capable of carrying communications and/or data signals between provider subsystem 202 and access subsystem 204. For example, network 206 may include, but is not limited to, a cable network, optical fiber network, hybrid fiber coax network, wireless network (e.g., a Wi-Fi and/or mobile telephone network), satellite network, wireless broadcast network (e.g., a satellite media broadcasting network or terrestrial broadcasting network), subscriber television network, a provider-specific network (e.g., a Verizon® FIOS® network), the Internet, an intranet, local area network, any other suitable network, and any combination or sub-combination of these networks.

Provider subsystem 202 and access subsystem 204 may communicate over network 206 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

While FIG. 2 shows provider subsystem 202 and access subsystem 204 communicatively coupled via network 206, it will be recognized that provider subsystem 202 and access subsystem 204 may be configured to communicate one with another in any other suitable manner (e.g., via a direct connection). Moreover, it will be recognized that in some examples, system 100 may be implemented entirely on access subsystem 204.

In some examples, provider subsystem 202 may be configured to generate or otherwise provide media content (e.g., in the form of one or more media content streams, one or more media content files, etc.) to access subsystem 204. Access subsystem 204 may be configured to facilitate access by a user to media content received from provider subsystem 202. To this end, access subsystem 204 may present the media content for experiencing (e.g., viewing) by a user, record the media content, parse metadata and/or other data associated with the media content, etc. Presentation of the media content may include, but is not limited to, displaying, playing, or otherwise presenting the media content, or one or more components of the media content, such that the media content may be experienced by the user.

Figure 3:
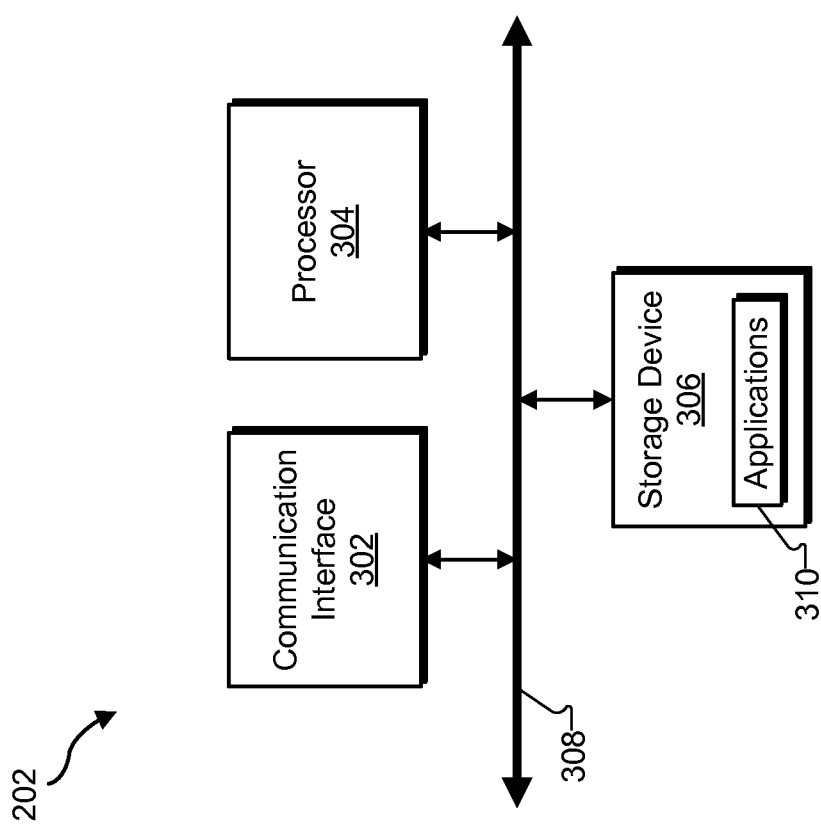
FIG. 3 illustrates exemplary components of a media content provider subsystem according to principles described herein.

FIG. 3 illustrates exemplary components of provider subsystem 202. As shown in FIG. 3, provider subsystem 202 may include a communication interface 302, a processor 304, and a storage device 306 communicatively coupled one to another via a communication infrastructure 308. The components of provider subsystem 202 may communicate with one another, including sending data to and receiving data from one another, using any suitable communication technologies. Moreover, the components of provider subsystem 202 may be implemented on any computing device or combination of computing devices, such as one or more servers, personal computers, or the like.

While an exemplary provider subsystem 202 is shown in FIG. 3, the components illustrated in FIG. 3 are not intended to be limiting. Additional or alternative components may be used in other embodiments. Components of the provider subsystem 202 shown in FIG. 3 will now be described in additional detail.

Communication interface 302 may be configured to communicate with one or more computing devices, including access subsystem 204. In particular, communication interface 302 may be configured to transmit and/or receive communication signals, media content, and/or data to/from access subsystem 204. Examples of communication interface 302 include, without limitation, a wired network interface (such as a network interface card), a wireless network interface (such as a wireless network interface card), a modem, and any other suitable interface. In at least one embodiment, communication interface 302 may provide a direct connection between provider subsystem 202 and access subsystem 204 via a direct link to a network, such as the Internet. Communication interface 302 may additionally or alternatively provide such a connection through, for example, a local area network (such as an Ethernet network), a personal area network, a telephone or cable network, a cellular telephone connection, a satellite data connection, or any other suitable connection.

In some examples, communication interface 302 may be configured to transmit data representative of one or more media content instances to access subsystem 204. Such data may be transmitted in one or more media content data streams, as one or more data files, or in any other suitable manner as may serve a particular application. Communication interface 302 may be configured to interface with any suitable communication media, protocols, and formats, including any of those mentioned above.

Processor 304 generally represents any type or form of processing unit capable of processing data or interpreting, executing, and/or directing execution of one or more of the instructions, processes, and/or operations described herein. Processor 304 may direct execution of operations in accordance with one or more applications 310 or other computer-executable instructions such as may be stored in storage device 306 or another computer-readable medium. As an example, processor 304 may be configured to process data, including modulating, encoding, and/or otherwise preparing data (e.g., media content data) for transmission by communication interface 302.

Storage device 306 may include one or more data storage media, devices, or configurations and may employ any type, form, and combination of data storage media and/or device. For example, storage device 306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 306. For example, data representative of one or more executable applications 310 configured to direct processor 304 to perform any of the operations described herein may be stored within storage device 306. In some examples, data may be arranged in one or more databases residing within storage device 306.

In some examples, display facility 102 and/or storage facility 104 may be implemented by or within one or more components of provider subsystem 202. For example, one or more applications 310 residing within storage device 306 may be configured to direct processor 304 to perform one or more processes or functions associated with display facility 102. Likewise, storage facility 104 may be implemented by or within storage device 306. For example, media content data 106, metadata data 108, and/or graphical object data 110 may be stored within storage device 306.

Figure 4:
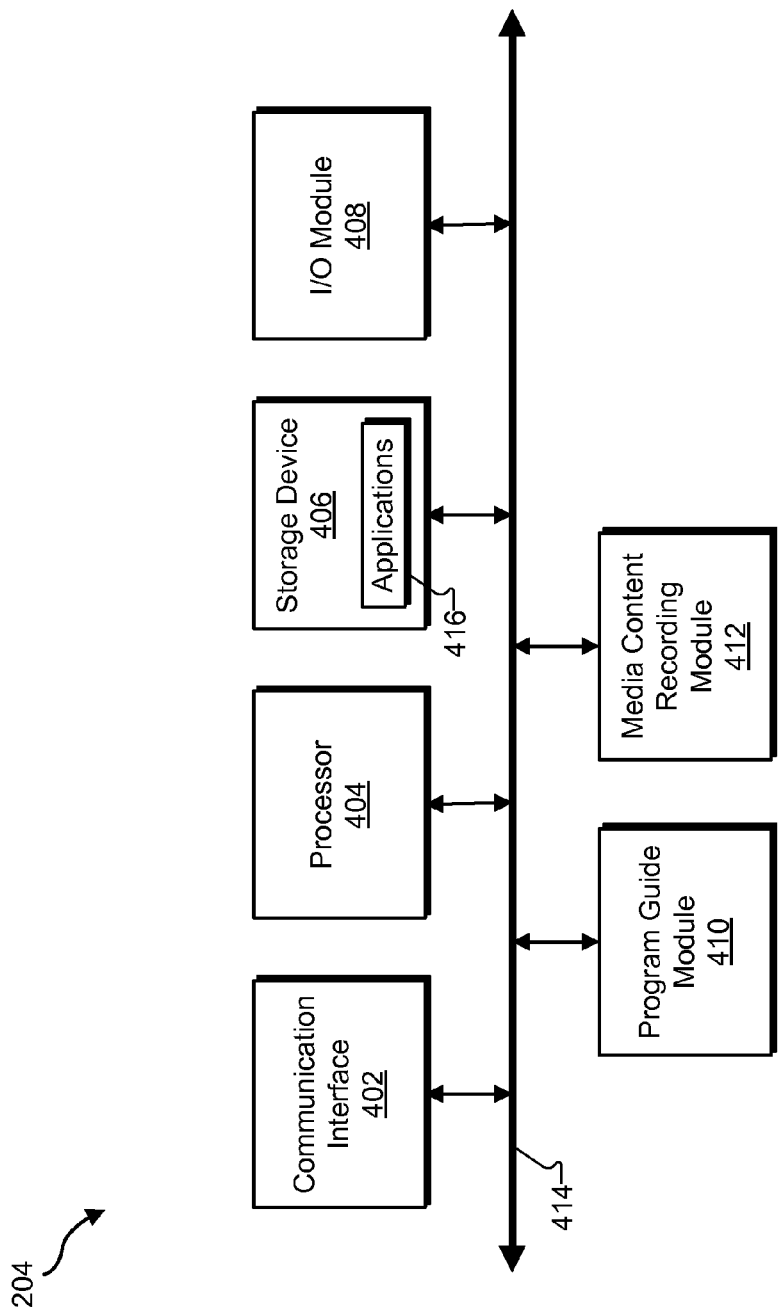
FIG. 4 illustrates exemplary components of a media content access subsystem according to principles described herein.

FIG. 4 illustrates exemplary components of access subsystem 204. As shown in FIG. 4, access subsystem 204 may include a communication interface 402, a processor 404, a storage device 406, an input/output ("I/O") module 408, a program guide module 410, and a media content recording module 412 communicatively coupled one to another via a communication infrastructure 414. The components of access subsystem 204 may communicate with one another, including sending data to and receiving data from one another, using any suitable communication technologies. Moreover, the components of access subsystem 204 may be implemented on any computing device or combination of computing devices, such as a set-top box, a media content processing device, a communications device, an audio file player device, a mobile device (e.g., a mobile phone device), a handheld device, a personal computer, a phone device (e.g., Verizon Hub device), a personal-digital assistant device, a gaming device, a digital video recording ("DVR") device (e.g., a personal video recording ("PVR") device), a television device, and/or any media content access device configured to perform one or more of the processes and/or operations described herein.

While an exemplary access subsystem 204 is shown in FIG. 4, the components illustrated in FIG. 4 are not intended to be limiting. Additional or alternative components may be used in other embodiments. Components of the access subsystem 204 shown in FIG. 4 will now be described in additional detail.

Communication interface 402 may be configured to communicate with one or more computing devices, including provider subsystem 202. In particular, communication interface 402 may be configured to transmit and/or receive communication signals, media content, and/or data to/from provider subsystem 202. Examples of communication interface 402 include, without limitation, a wired network interface (such as a network interface card), a wireless network interface (such as a wireless network interface card), a modem, and any other suitable interface. In at least one embodiment, communication interface 402 may provide a direct connection between provider subsystem 202 and access subsystem 204 via a direct link to a network, such as the Internet. Communication interface 402 may additionally or alternatively provide such a connection through, for example, a local area network (such as an Ethernet network), a personal area network, a telephone or cable network, a cellular telephone connection, a satellite data connection, or any other suitable connection.

As mentioned, provider subsystem 202 may transmit data representative of one or more media content instances. Communication interface 402 may be configured to receive such data such that the data may be processed by access subsystem 204. To this end, communication interface 402 may include any device, logic, and/or other technologies suitable for receiving signals, data streams, and/or data representative of media content. Communication interface 402 may be configured to interface with any suitable communication media, protocols, and formats, including any of those mentioned above.

In certain embodiments, provider subsystem 202 may be configured to transmit and access subsystem 204 may be configured to receive data streams or signals including data representative of various media content instances in accordance with a transmission schedule. The transmission schedule may specify that particular media content instances are to be transmitted at scheduled transmission times and on certain media content carrier channels. As used herein, the term "scheduled transmission time" or "scheduled transmission" may refer generally to any period of time during which a media content instance is to be transmitted to access subsystem 204. The term "media content carrier channel" or "media content channel" as used herein may refer generally to any carrier of media content, including, but not limited to, media (e.g., television) channels, streams, addresses, frequencies or other carriers of media content.

Communication interface 402 may be configured to selectively identify, receive, and/or process appropriate data streams and/or media content instances at the scheduled transmission times and on the appropriate media content carrier channels. For instance, in certain implementations communication interface 402 may include a tuner configured to selectively receive media content carried on a particular media content carrier channel. The tuner may be tuned to a particular media content carrier channel such that the media content carried on the media content carrier channel is received and may be processed by access subsystem 204.

In some examples, communication interface 402 may include multiple tuners such that media content carried on different media content carrier channels may be concurrently received for processing by the access subsystem 204. For example, communication interface 402 may include a first tuner configured to receive media content carried on an analog video signal and a second tuner configured to concurrently receive media content carried on a digital compressed signal.

While one or more tuners may be used to receive various types of media content-carrying signals transmitted by provider subsystem 202, additionally or alternatively, communication interface 402 may be configured to receive other types of signals (e.g., other types of media content carrying signals) from provider subsystem 202 and/or one or more other sources without using a tuner. For example, provider subsystem 202 may transmit digital streams of data packets (e.g., Internet Protocol ("IP") based data packets) that can be received without using a tuner. For such types of signals, communication interface 402 may receive and forward the signals directly to other components of access subsystem 204 without the signals going through a tuner. For an IP-based signal, for example, communication interface 402 may function as an IP receiver.

Processor 404 generally represents any type or form of processing unit capable of processing data or interpreting, executing, and/or directing execution of one or more of the instructions, processes, and/or operations described herein. Processor 404 may direct execution of operations in accordance with one or more applications 504 or other computer-executable instructions such as may be stored in storage device 406 or another computer-readable medium. As an example, processor 404 may be configured to process data, including demodulating, decoding, and/or parsing data (e.g., data representative of media content received from provider subsystem 202 by communication interface 402), and encoding and modulating data for transmission by communication interface 402.

Storage device 406 may include one or more data storage media, devices, or configurations and may employ any type, form, and combination of data storage media and/or device. For example, storage device 406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 406. For example, data representative of one or more executable applications 416 configured to direct processor 404 to perform any of the operations described herein may be stored within storage device 406. In some examples, data may be arranged in one or more databases residing within storage device 406.

I/O module 408 may be configured to receive user input and provide user output and may include any hardware, firmware, software, or combination thereof supportive of input and output capabilities. For example, I/O module 408 may include one or more devices for capturing user input, including, but not limited to, a microphone, speech recognition technologies, keyboard or keypad, touch screen component (e.g., touch screen display), receiver (e.g., an RF or infrared receiver), and one or more input buttons.

I/O module 408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 408 is configured to provide graphical data to a display for presentation to a user. The graphical data may representative of one or more graphical user interfaces ("GUIs"), GUI views, media content views, and/or any other view as may serve a particular application.

Program guide module 410 may be configured to maintain and operate on program guide data. As mentioned above, media content instances may be transmitted by provider subsystem 202 at scheduled transmission times and on certain media content carrier channels. To assist access subsystem 204 and/or a user of access subsystem 204 with reception of media content instances at appropriate scheduled transmission times and on appropriate media content carrier channels, program guide data may be received by communication interface 402 from provider subsystem 202 and/or from another source. The program guide data may be stored in storage device 406.

Media content recording module 412 may be configured to record data representative of media content to storage device 406. The recording of a media content instance is typically performed during a transmission time slot when data representative of the media content instance is received from provider subsystem 202 as described above. For example, during transmission of a media content instance from provider subsystem 202 to access subsystem 204 on a media content carrier channel, communication interface 402 may receive data representative of the media content instance on the media content carrier channel, and media content recording module 412 may direct that the received data representative of the media content instance be stored to storage device 406. Once stored, the data representative the media content instance may be accessed and processed as may suit a particular application, including providing data representative of the media content instance to a display for presentation to a user.

In some examples, display facility 102 and/or storage facility 104 may be implemented by or within one or more components of access subsystem 204. For example, one or more applications 416 residing within storage device 406 may be configured to direct processor 404 to perform one or more processes or functions associated with display facility 102. Likewise, storage facility 104 may be implemented by or within storage device 406. For example, media content data 106, metadata data 108, and/or graphical object data 110 may be stored within storage device 406.

Figure 5:
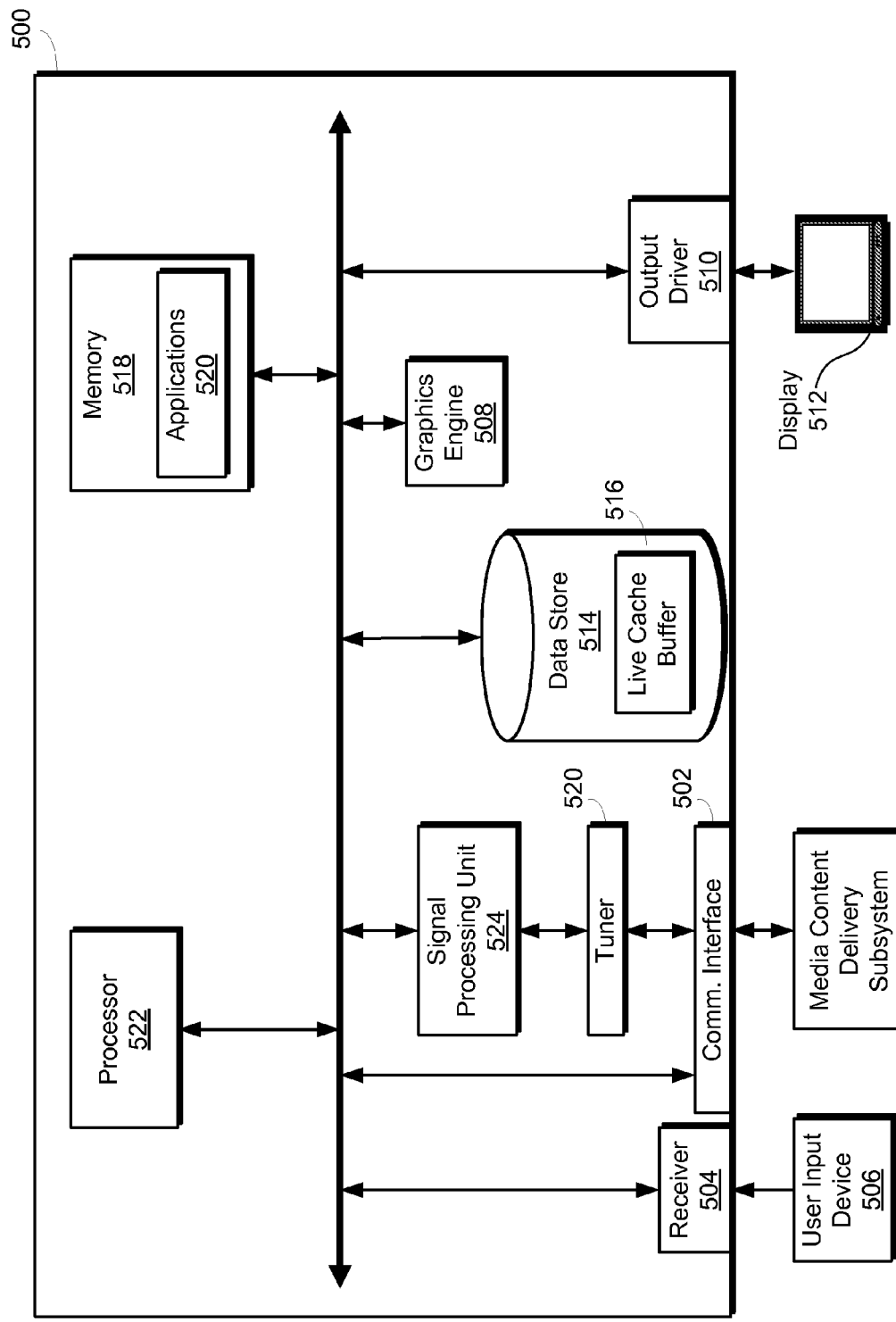
FIG. 5 illustrates an exemplary media content access device having the media content access subsystem of FIG. 4 implemented thereon according to principles described herein.

Access subsystem 204 and/or components of access subsystem 204 may be implemented as may suit a particular application. FIG. 5 illustrates an exemplary media content access device 500 (or simply "access device 500") having access subsystem 204 implemented thereon. Access device 500 may include one or more of the components of access subsystem 204 shown in FIG. 4 and may be configured to perform one or more of the processes and/or operations described herein. Access device 500 may include, but is not limited to, a set-top box, a media content processing device, a communications device, an audio file player device, a mobile device (e.g., a mobile phone device), a handheld device, a personal computer, a phone device (e.g., Verizon Hub device), a personal-digital assistant device, a gaming device, a DVR device (e.g., a personal video recording PVR device), a television device, and/or any device configured to perform one or more of the processes and/or operations described herein.

As shown in FIG. 5, access device 500 may include a communication interface 502 configured to receive media content and/or data (e.g., metadata, program guide data, and/or any other data associated with media content) in any acceptable format from provider subsystem 202 or from any other suitable external source. Communication interface 502 may include any device, logic, and/or other technologies suitable for receiving signals and/or data representative of media content and/or other types of media content or data. Communication interface 502 may be configured to interface with any suitable communication media, protocols, and formats, including any of those mentioned above.

Access device 500 may also include a receiver 504 configured to receive user input signals from a user input device 506. User input device 506 may include, for example, a remote control device or any other suitable input device and may be configured to communicate with receiver 504 via a wireless link, electrical connection, or any other suitable communication link.

Figure 6:
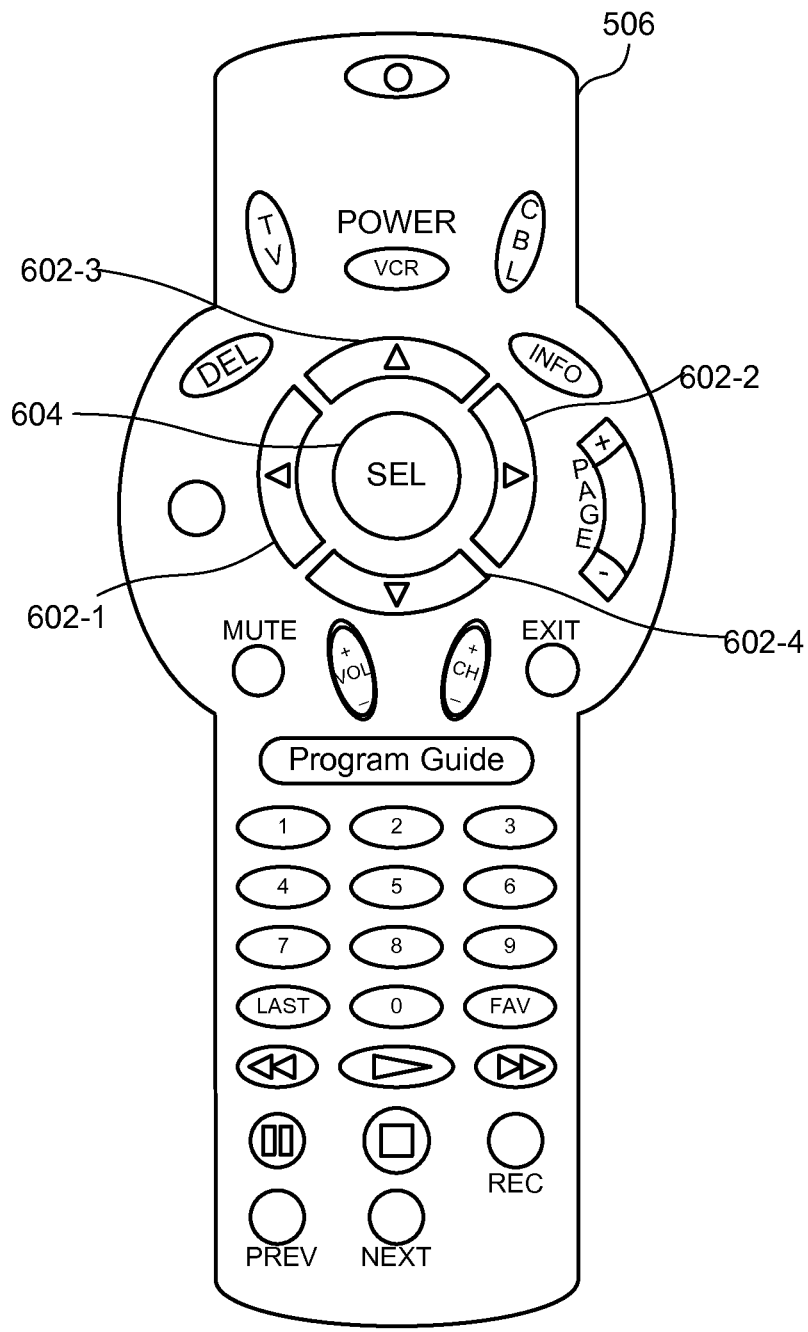
FIG. 6 illustrates an exemplary remote control user input device according to principles described herein.

FIG. 6 illustrates an exemplary remote control user input device 506. In some examples, input device 506 may be configured to facilitate a user controlling operations of access subsystem 204. For instance, one or more directional keys (e.g., left directional key 602-1, right directional key 602-2, up directional key 602-3, and down directional key 602-4, collectively referred to herein as "directional keys 602") and a select key 604 may be configured to facilitate transmission by a user of one or more user input commands to access device 500. In this manner, the user may navigate through one or more graphical user interfaces ("GUIs") that may be displayed by access device 500 on display 512. Similar keys or buttons may be included within other implementations of user input device 506 as may serve a particular application. As will be described in more detail below, directional keys 602 may be used to search for and access a desired media content instance.

Returning to FIG. 5, access device 500 may include a graphics engine 508 and an output driver 510. Graphics engine 508 may be configured to generate graphics to be provided to output driver 510, which may be configured to interface with or drive a display 512. Output driver 510 may provide output signals to display 512, the output signals including graphical media content (e.g., media content and/or program guide media content) generated by graphics engine 508 and to be presented by display 512 for experiencing by a user. For example, output driver 510 may provide a data representative of a GUI including a program guide view to display 512 for presentation to the user. Graphics engine 508 and output driver 510 may include any combination of hardware, software, and/or firmware as may serve a particular application.

Data store 514 may include one or more data storage media, devices, or configurations and may employ any type, form, and combination of storage media. For example, data store 514 may include, but is not limited to, a hard drive, network drive, flash drive, magnetic disc, optical disc, or other non-volatile storage unit. Media content and/or data associated with media content may be temporarily and/or permanently stored in data store 514.

Data store 514 is shown to be included within access device 500 in FIG. 5 for illustrative purposes only. It will be understood that data store 514 may additionally or alternatively be located external to access device 500.

Data store 514 may include one or more live cache buffers 516. Live cache buffer 516 may additionally or alternatively reside in memory 518 or in a storage device external to access device 500. In some examples, media content data may be temporarily stored in live cache buffer 516 to facilitate viewing and/or recording of the media content.

Access device 500 may include memory 518. Memory 518 may include, but is not limited to, FLASH memory, random access memory ("RAM"), dynamic RAM ("DRAM"), other suitable computer-readable media, or any combination or sub-combination thereof. In some examples, one or more applications 520 configured to run on or otherwise be executed by access device 500 may reside in memory 518.

Access device 500 may include one or more tuners 520. Tuner 520 may be configured to selectively receive media content carried on a particular media content carrier channel such that the media content may be processed by access device 500. In some examples, media content received by tuner 520 may be temporarily buffered, or stored, in the live cache buffer 516. If there are multiple tuners 520, there may be a live cache buffer 516 corresponding to each of the tuners 520.

While tuner 520 may be used to receive certain media content-carrying signals transmitted by provider subsystem 202, access device 500 may be configured to receive other types of media content signals (including media content signals and/or program guide data signals) from provider subsystem 202 and/or one or more other sources without using a tuner. For example, provider subsystem 202 may transmit digital streams of data packets (e.g., Internet Protocol ("IP") based data packets) that can be received without using a tuner. For such types of media content signals, communication interface 502 may receive and forward the signals directly to other components of access device 500 (e.g., processor 522 or signal processing unit 524, described in more detail below) without the signals going through tuner 520. For an IP-based signal, for example, signal processing unit 524 may function as an IP receiver.

Access device 500 may include at least one processor, such as processor 522, configured to control and/or perform one or more operations of access device 500. Access device 500 may also include a signal processing unit 524 configured to process incoming media content. Signal processing unit 524 may be configured, for example, to demodulate and parse encoded digital media content. In some examples, access device 500 may include one or more signal processing units 524 corresponding to each of the tuners 520.

Access subsystem 204 may be configured to facilitate access to large electronic libraries of media content instances. For example, a user may download or otherwise obtain and store tens of thousands of media content instances within access subsystem 204. Network-enabled access subsystems 204 may additionally or alternatively facilitate access to millions of media content instances stored within provider subsystem 202 and/or any other connected device or subsystem storing content.

It is often difficult and cumbersome to search through a large media content library and locate a media content instance of interest that is stored within the media content library. The exemplary systems and methods described herein allow a user to locate and/or access a particular media content instance within a plurality of media content instances by navigating, filtering, or "drilling down" through a hierarchy of metadata categories associated with media content instances.

Figure 7:
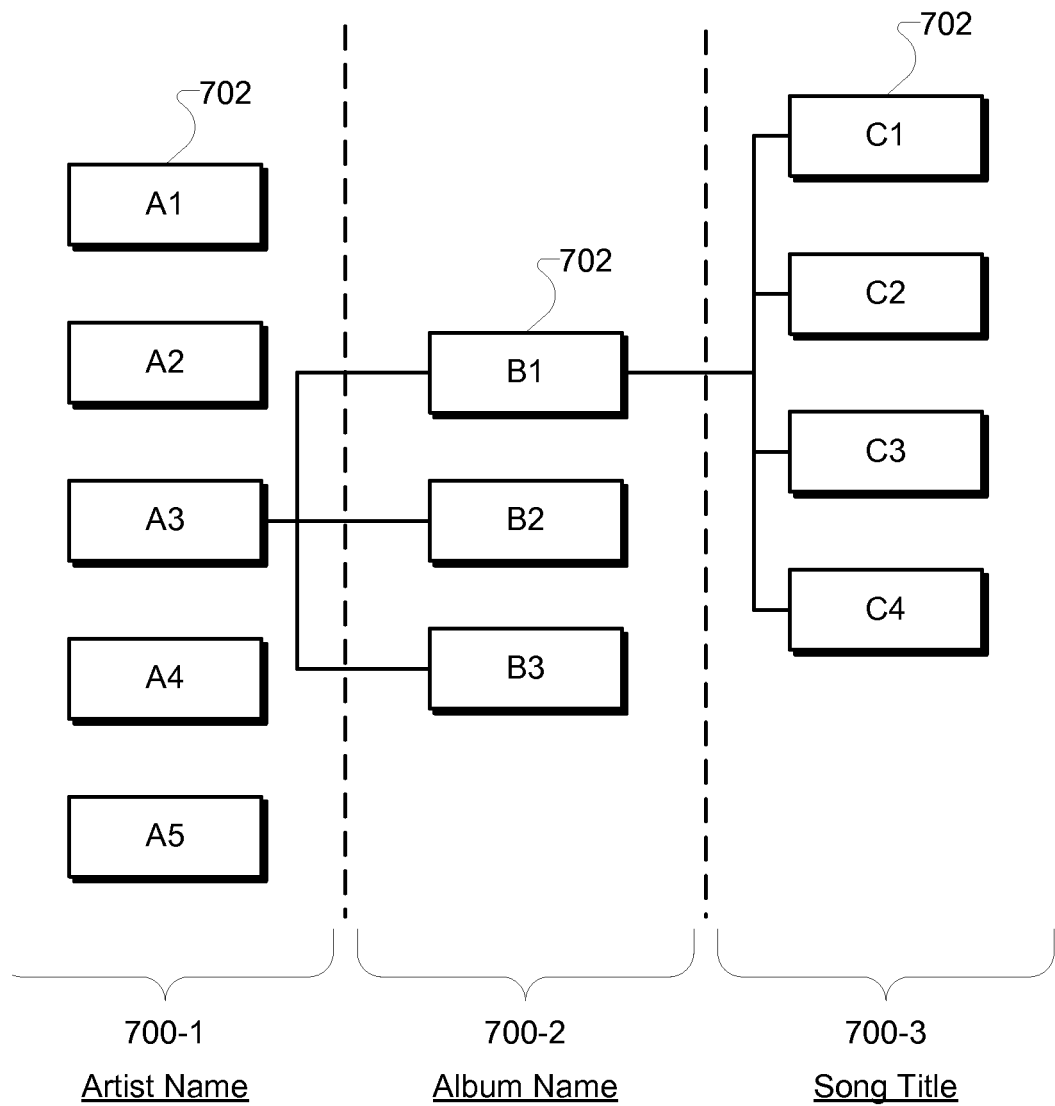
FIG. 7 is a graphical representation of a number of metadata categories according to principles described herein.

FIG. 7 is a graphical representation of a number of metadata categories 700 (e.g., metadata categories 700-1 through 700-3). Three metadata categories are shown in FIG. 7 for illustrative purposes. It will be recognized that the user may navigate through any number of metadata categories to access a particular media content instance as may serve a particular application.

For illustrative purposes, the exemplary metadata categories 700 shown in FIG. 7 correspond to audio content (e.g., songs). For example, the first metadata category 700-1 may correspond to artist names, the second metadata category 700-2 may correspond to album names, and the third metadata category 700-3 may correspond to song titles. It will be recognized that metadata categories 700 are merely illustrative of the many metadata categories that may be associated with a plurality of media content instances.

In some examples, metadata categories 700 may be hierarchically organized. In other words, metadata categories 700 may be presented to a user in a pre-defined hierarchy or ranking. Hence, as a user drills down through a series of metadata categories 700, the order in which the metadata categories 700 are presented to a user is in accordance with the pre-defined hierarchy. The hierarchical organization of metadata categories 700 may be based on the type of media content accessed by a user, user preferences, and/or any other factor as may serve a particular application. In some examples, the first metadata category (e.g., metadata category 700-1) within a hierarchical organization of categories is referred to as the "top category" while the other metadata categories (e.g., metadata categories 700-2 and 700-3) are referred to as "subcategories."

Each category 700 may include a number of selectable entries 702. For example, the first category 700-1 shown in FIG. 7 includes entries A1-A5, the second category 700-2 includes entries B1-B3, and the third category 700-3 includes entries C1-C4. Each entry 702 represents a metadata value by which media content instances within the media content library may be filtered. In this manner, a user may select an entry 702 within one or more metadata categories 700 to filter the available media content instances within a media content library based on the metadata value corresponding to the selected entry 702. Such functions of selecting and filtering may be performed for one or more metadata categories 700 until a desired media content instance is located.

To illustrate, each entry 702 within the first metadata category 700-1 may correspond to a metadata value defining the name of an artist of at least one song within a media content library. A user may sort (e.g., scroll) through the various artist names within metadata category 700-1 and select a desired artist (e.g., entry A3). In response to this selection, the second metadata category 700-2 is presented to the user. Entries 702 within the second metadata category 700-2 may correspond to metadata values defining the names of albums within the media content library that are associated with the artist selected in metadata category 700-1. The user may sort through the various album names included within the second metadata category 700-2 and select a desired album (e.g., entry B1). In response to this selection, the third metadata category 700-3 is presented to the user. Entries 702 within the third metadata category 700-3 may correspond to metadata values defining titles of songs within the album selected in metadata category 700-2. A user may then select a song title within the entries 702 of the third metadata category 700-3 to access a desired song within the media content library.

The use of metadata categories 700 allows a user to apply multiple filtering criteria to a media content library without having to enter text queries. For example, a user may locate a desired media content instance within a media content library by navigating through a series of metadata categories 700 corresponding to the desired media content instance using only the directional keys 602 to provide user input commands.

To illustrate, a user may use the left and right directional keys 602-1 and 602-2 to scroll through entries contained within a first metadata category (e.g., metadata category 700-1). When a desired entry is located, the user may press the up directional key 602-3 to select the entry and drill down to a second metadata category (e.g., metadata category 700-2) based on the selected entry. The user may again use the left and right directional keys 602-1 and 602-2 to scroll through entries contained within the second metadata category to locate a desired entry contained therein. To select an entry within the second metadata category, the user may press the up directional key 602-3. The user may drill down through additional metadata categories in a similar manner until a desired media content instance is located. The user may then select the desired media content instance (e.g., by pressing the up directional key 602-3 and/or the select key 604).

It will be recognized that alternative keys (or other input mechanisms) to those described herein may be used to navigate through a series of metadata categories 700 and select one or more entries within the metadata categories 700. For example, the up and down directional keys 602-3 and 602-4 may be used to scroll through entries contained within a particular metadata category. Likewise, the select key 604 may be used to select an entry within a metadata category 700. However, for illustrative purposes, the left and right directional keys 602-1 and 602-2 are used to scroll through entries contained within a metadata category 700 and the up directional key 602-3 is used to select an entry within a metadata category 700 in the examples given herein.

Figure 8:
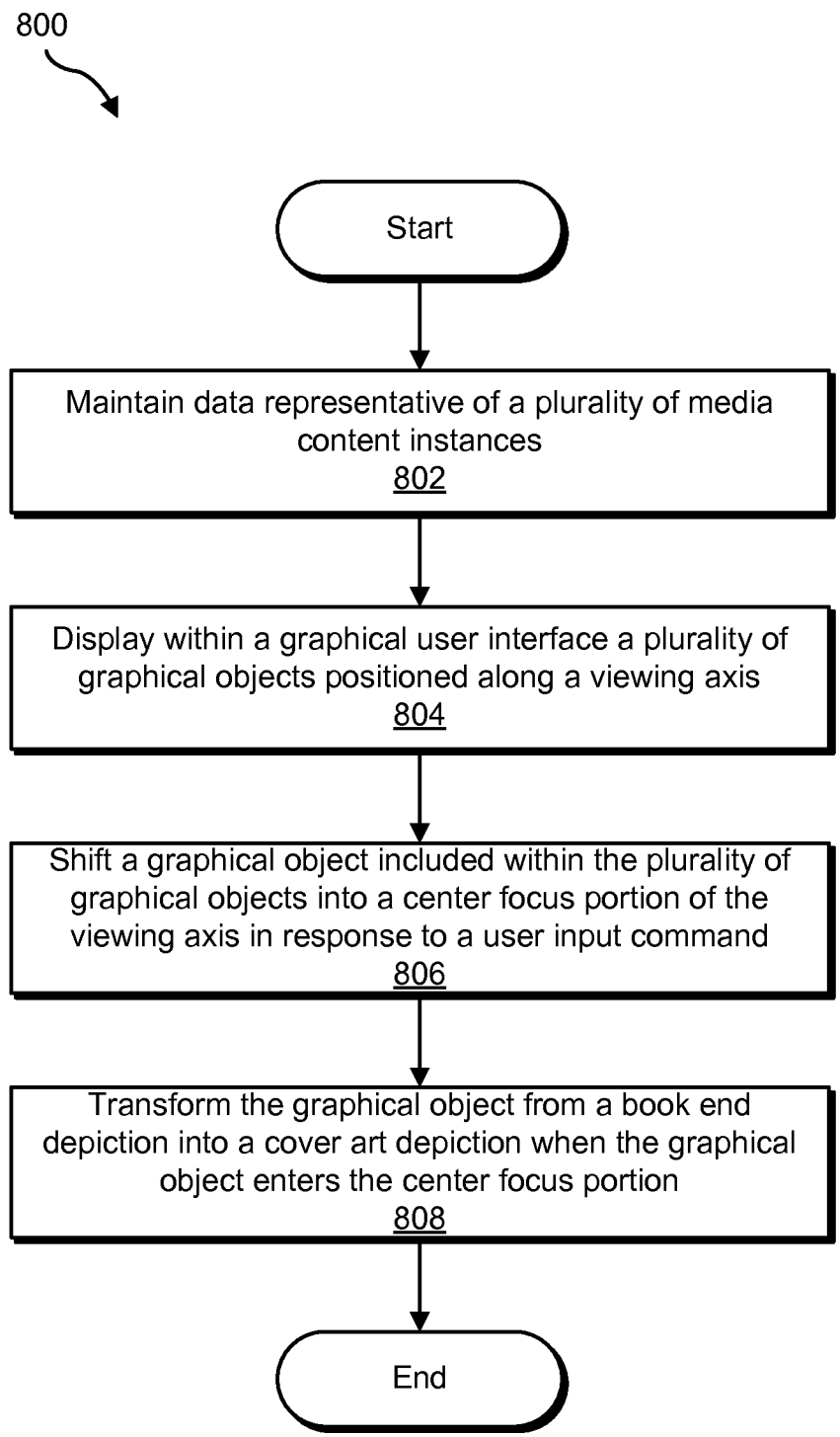
FIG. 8 illustrates an exemplary media content instance search method according to principles described herein.

FIG. 8 illustrates an exemplary media content instance search method 800. While FIG. 8 illustrates exemplary steps according to one embodiment, other embodiments may omit, add to, reorder, and/or modify any of the steps shown in FIG. 8.

In step 802, data representative of a plurality of media content instances is maintained. For example, storage facility 104 may be configured to maintain media content data 106 representative of a plurality of media content instances. The media content instances may be stored within access subsystem 204 (e.g., in the form of a media content library), within media content provider subsystem 202, and/or within any other device as may serve a particular application.

In step 804, a plurality of graphical objects positioned along a viewing axis is displayed within a GUI that is presented to a user. The graphical objects may be displayed within the GUI by display facility 102. Each graphical object represents a metadata value within a metadata category associated with the plurality of media content instances maintained in step 802. As will be described in more detail below, the graphical objects may be configured to allow a user to visually identify and distinguish entries within a metadata category one from another. In this manner, a user may quickly and efficiently locate and/or access a desired media content instance.

Figure 9:
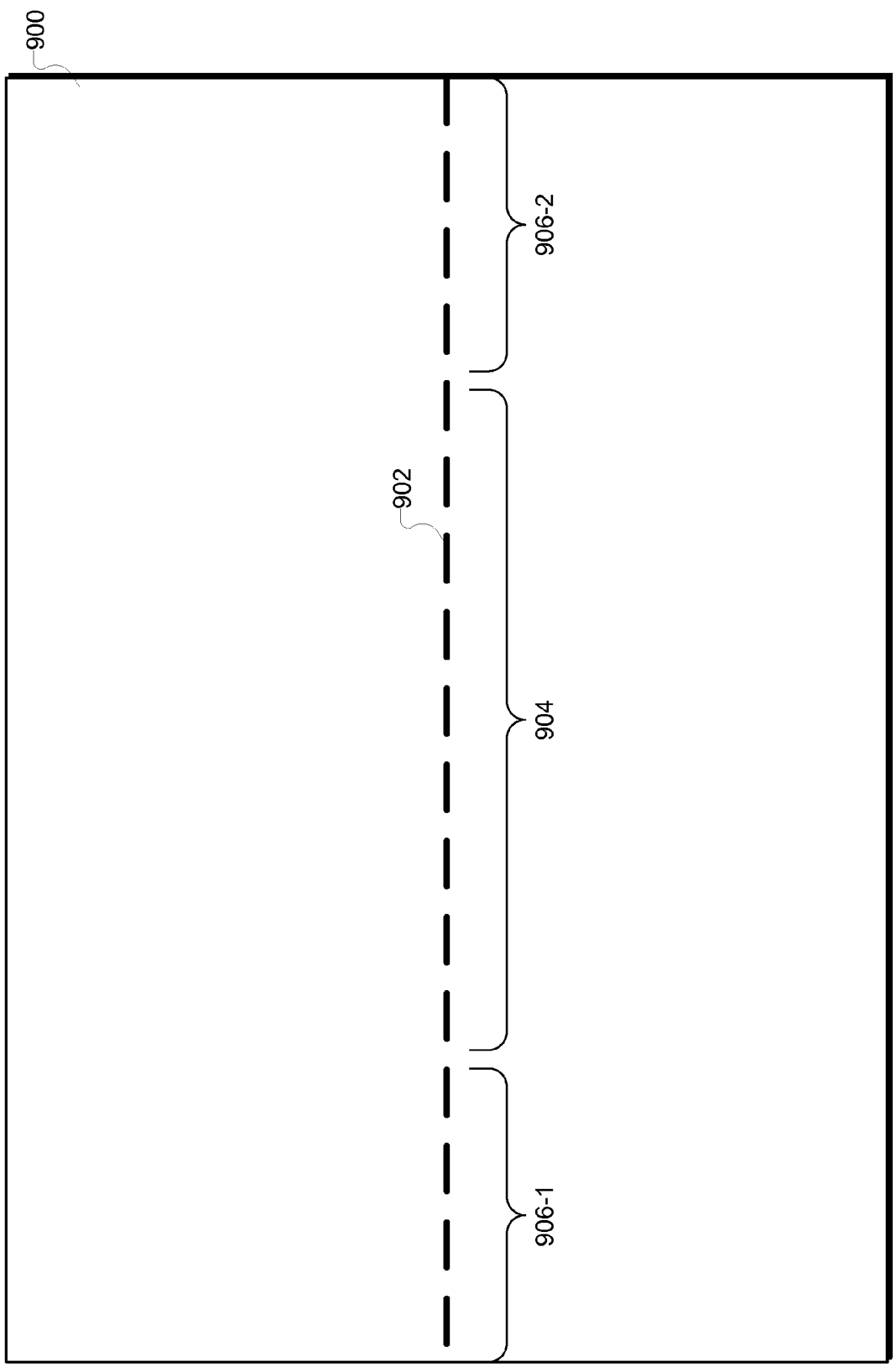
FIG. 9 illustrates an exemplary graphical user interface ("GUI") within which a plurality of graphical objects may be displayed according to principles described herein.

FIG. 9 illustrates an exemplary GUI 900 within which the graphical objects may be displayed by display facility 102 in step 804. GUI 900 may be displayed on display 512 of access device 500 or on any other display as may serve a particular application.

As shown in FIG. 9, GUI 900 may include a viewing axis 902. It will be recognized that the dashed line representing viewing axis 902 in FIG. 9 is merely illustrative and that it may not be visible to a viewer of GUI 900.

In some examples, viewing axis 902 may be disposed horizontally within GUI 900 and centered vertically, as shown in FIG. 9. It will be recognized that viewing axis 902 may be located within GUI 900 at any other position and/or orientation as may serve a particular application.

As shown in FIG. 9, viewing axis 902 may include a center focus portion 904 positioned between first and second peripheral portions 906-1 and 906-2 (collectively referred to herein as "peripheral portions 906"). As will be described in more detail below, a subset of the graphical objects may be displayed within the center focus portion 904 and a subset of the graphical objects may be displayed within each of the peripheral portions 906.

Figure 10:
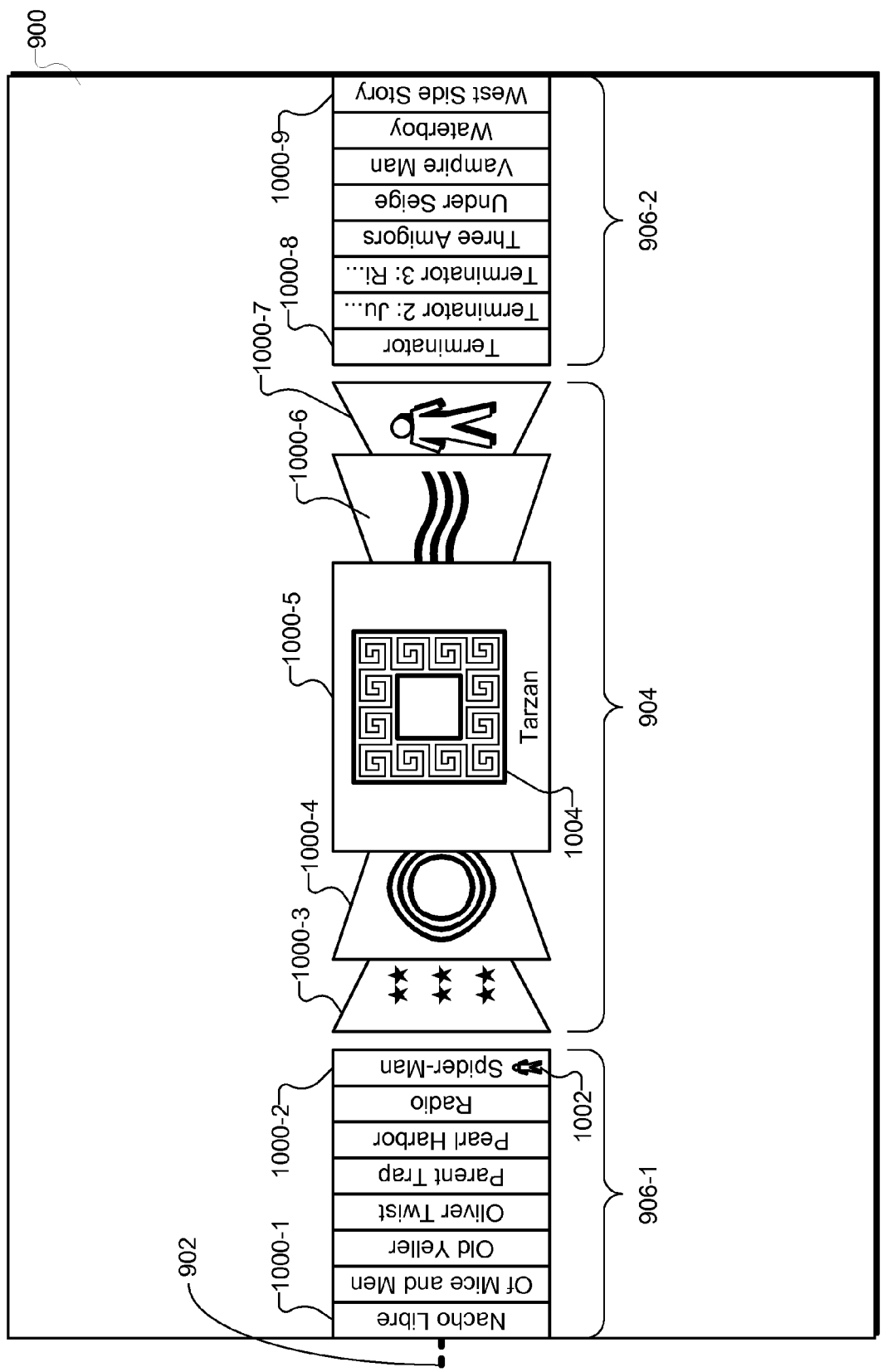
FIG. 10 shows the GUI of FIG. 9 with a plurality of graphical objects displayed therein according to principles described herein.

FIG. 10 shows GUI 900 with a plurality of graphical objects 1000 (e.g., graphical objects 1000-1 through 1000-9) displayed therein. As mentioned, each graphical object 1000 represents a metadata value within a metadata category associated with the plurality of media content instances maintained in step 802. For example, each graphical object 1000 shown in FIG. 10 represents a movie title within a movie title category associated with a plurality of movies accessible via access subsystem 204.

As shown in FIG. 10, graphical objects 1000 are positioned along viewing axis 902. A subset of the graphical objects 1000 (e.g., graphical objects and 1000-2 and those disposed therebetween) are displayed within first peripheral portion 906-1, a subset of the graphical objects 1000 (e.g., graphical objects 1000-3 through 1000-7) are displayed within center focus portion 904, and a subset of the graphical objects 1000 (e.g., graphical objects 1000-8 and 1000-9 and those disposed therebetween) are displayed within second peripheral portion 906-2. It will be recognized that any number of graphical objects 1000 may be included within the subsets of graphical objects 1000 displayed within peripheral portions 906 and within the subset of graphical objects 1000 displayed within center focus portion 904. For example, although five graphical objects 1000 are shown to be displayed within center focus portion 904 in FIG. 10, any number (e.g., one) of graphical objects 1000 may be displayed within center focus portion 904 as may serve a particular application.

In some examples, display facility 102 may be configured to depict the graphical objects 1000 displayed within the peripheral portions 906 of viewing axis 902 as book ends and the graphical objects 1000 displayed within the center focus portion 904 of viewing axis 902 as cover art. As illustrated by graphical objects 1000-1, 1000-2, 1000-8, and 1000-9 in FIG. 10, a graphical object 1000 depicted as a "book end" includes a generally rectangular object with content displayed therein such that the graphical object 1000 is visually similar to a spine or end of a book, CD case, DVD case, or other media content housing.

In some examples, the content included within a graphical object 1000 depicted as a book end includes text representative of the metadata value associated with the graphical object 1000. For example, graphical object 1000-1 includes the text "Nacho Libre," which is representative of the title of a movie corresponding to graphical object 1000-1.

The text displayed in each graphical object 1000 depicted as a book end may be vertically oriented, as shown in FIG. 10. It will be recognized that the text may be alternatively arranged within a graphical object 1000 depicted as a book end as may serve a particular application.

In some examples, a graphical object 1000 depicted as a book end may additionally or alternatively include one or more images displayed therein. For example, graphical object 1000-2 shown in FIG. 10 includes both text ("Spider-Man") and an image 1002. Image 1002 may include any image as may serve a particular application. For example, image 1002 may include an image associated with a media content instance corresponding to graphical object 1000-2, a user-defined marking associated with the media content instance corresponding to graphical object 1000-2 (e.g., a "favorites" marking, etc.), and/or any other image as may serve a particular application.

As mentioned, a graphical object 1000 depicted as "cover art" includes content displayed therein that is visually similar to content (e.g., cover art) displayed on a cover of a book, CD case, DVD case, or other media content housing. For example, graphical object 1000-5 includes content that may be displayed on the cover of a DVD case corresponding to a movie associated with graphical object 1000-5.

In some examples, the content included within a graphical object 1000 depicted as cover art includes at least one image associated with the metadata value corresponding to the graphical object 1000. For example, graphical object 1000-5 includes an image 1004 associated with a title of a movie corresponding to graphical object 1000-5. The content included within a graphical object 1000 depicted as cover art may additionally or alternatively include text associated with the metadata value corresponding to the graphical object 1000. For example, graphical object 1000-5 also includes the text "Tarzan," which indicates the title of the movie corresponding to graphical object 1000-5. It will be recognized that any combination of images and/or text may be displayed within a graphical object 1000 depicted as cover art as may serve a particular application.

In some examples, a graphical object (e.g., graphical object 1000-5) depicted as cover art may be more prominently displayed within GUI 900 than a graphical object (e.g., graphical object 1000-2) depicted as a book cover. For example, a graphical object 1000 depicted as cover art may be larger than a graphical object 1000 depicted as a book end or otherwise distinguished from a graphical object 1000 depicted as a book end.

In some examples, the center-most graphical object (e.g., graphical object 1000-5) displayed within center focus portion 904 may be selected by access subsystem 204 in response to a user input command (e.g., user selection of up directional key 602-3 and/or select key 604). As will be described in more detail below, a graphical object 1000 may be selected to access a media content instance and/or one or more options or metadata values within a metadata subcategory associated with the graphical object 1000. To this end, the center-most graphical object (e.g., graphical object 1000-5) displayed within center focus portion 904 may be visually distinguished from the other graphical objects (e.g., graphical objects 1000-3, 1000-4, 1000-6, and 1000-7) displayed within center focus portion 904. For example, as shown in FIG. 10, graphical objects 1000-3, 1000-4, 1000-6, and 1000-7 are rotated and sized such that they direct attention to the center-most graphical object 1000-5. Graphical object 1000-5 may be visually distinguished from graphical objects 1000-3, 1000-4, 1000-6, and 1000-7 in any other way as may serve a particular application. In some examples, graphical objects 1000-3, 1000-4, 1000-6, and 1000-7 graphically represent a transition from a full front cover art depiction (e.g., graphical object 1000-5) to a book end depiction (e.g., graphical objects 1000-2 and 1000-8).

Returning to FIG. 8, and as shown in step 806, a graphical object included within the plurality of graphical objects displayed in step 804 is shifted into the center focus portion of the viewing axis in response to a user input command. In step 808, the graphical object is transformed from a book end depiction into a cover art depiction when it enters the center focus portion of the viewing axis. Steps 806 and 808 may be performed by display facility 102 and/or by any other facility as may serve a particular application.

Figure 11:
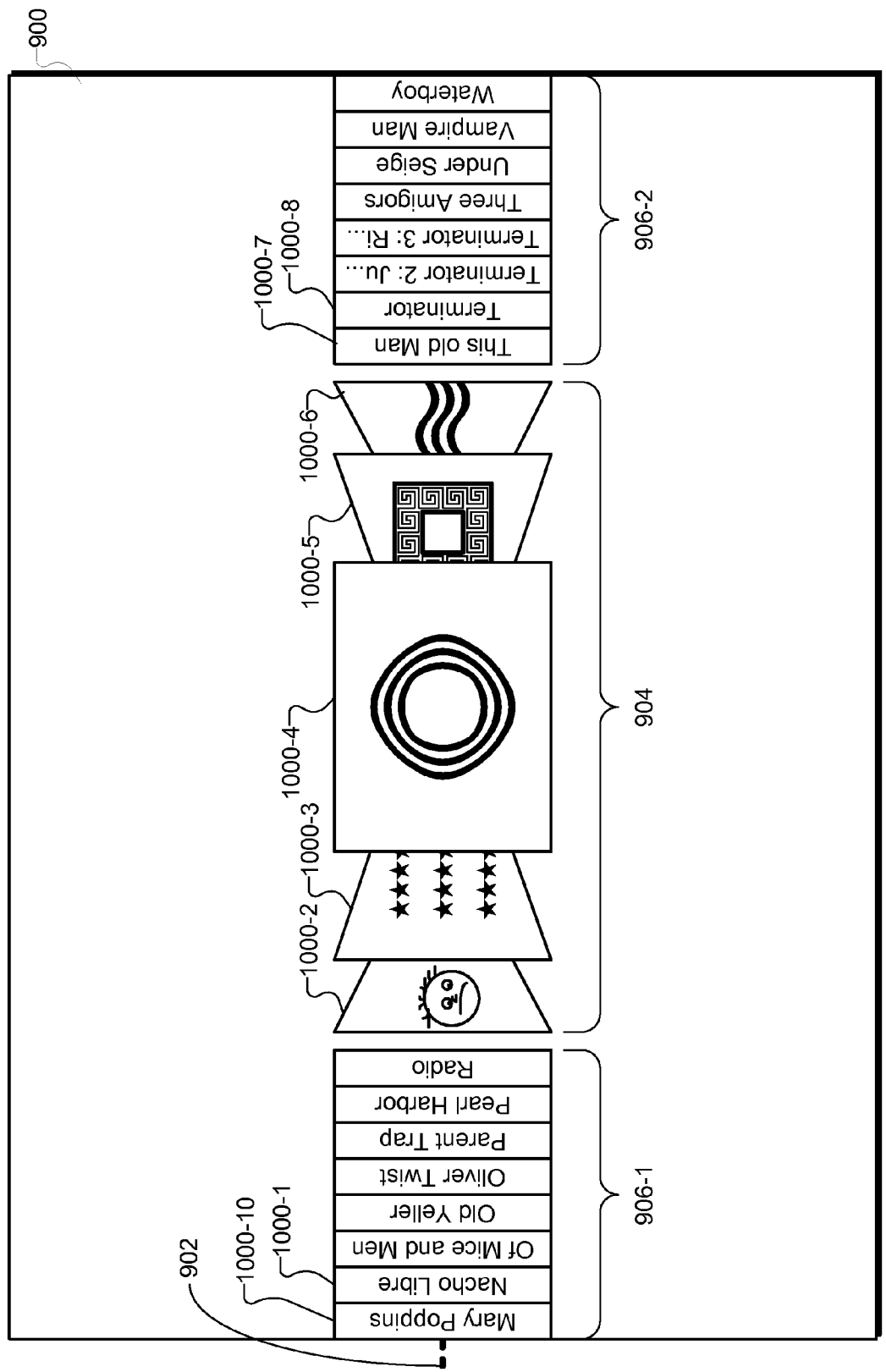
FIG. 11 shows the GUI of FIG. 9 after a user input command has been received by access subsystem to shift the graphical objects along viewing axis according to principles described herein.

To illustrate, FIG. 11 shows GUI 900 after a user input command has been received by access subsystem 204 to shift the graphical objects 1000 along viewing axis 902. The user input command may include any suitable command and may be transmitted in any suitable manner as may serve a particular application. For example, the user input command may be transmitted by user input device 506 in response to a user selecting left directional key 602-1.

As shown in FIG. 11, all of the graphical objects 1000 have shifted along viewing axis 902 to the right in response to the user input command. For example, graphical object 1000-4 has shifted into the center-most position within center focus portion 904. FIG. 11 also shows that graphical object 1000-9, which had been located at the right edge of GUI 900 in FIG. 10, has been shifted out of GUI 900 in response to the user input command and that a new graphical object 1000-10 is now displayed within the left-most position in response to the user input command.

As mentioned, display facility 102 may be configured to transform a graphical object 1000 from a book end depiction into a cover art depiction when the graphical object 1000 is shifted into center focus portion 904 of viewing axis 902. For example, FIG. 11 shows that graphical object 1000-2 has been transformed from a book end depiction into a cover art depiction upon entering center focus portion 904. Likewise, display facility 102 may be configured to transform a graphical object 1000 from a cover art depiction into a book end depiction when the graphical object 1000 is shifted out of center focus portion 904 into one of the peripheral portions 906 of viewing axis 902. For example, FIG. 11 shows that graphical object 1000-7 has been transformed from a cover art depiction into a book end depiction upon exiting center focus portion 904 and entering peripheral portion 906-2.

By shifting all of the graphical objects 1000 along viewing axis 902 in response to a user input command, a user may locate and/or access a particular media content instance by scrolling through a plurality of graphical objects 1000 until a graphical object (e.g., graphical object 1000-2) corresponding to the particular media content instance is located within the center-most position of the center focus portion 604 of viewing axis 602. The user may then transmit one or more user input commands to access a media content instance and/or one or more options or metadata values within a metadata subcategory associated with the graphical object. By depicting graphical objects 1000 as cover art within the center focus portion 904 and as book ends within the peripheral portions 906, the peripheral viewing capabilities of a user may be more effectively utilized.

In some examples, a plurality of selectable options and/or metadata values within a metadata subcategory corresponding to a graphical object 1000 located within center focus portion 904 may be displayed within GUI 900. For example, FIG. 12 shows a plurality of selectable graphical objects 1202 representing a plurality of options related to graphical object 1000-5 and a plurality of selectable graphical objects 1204 representing a plurality of metadata values within a metadata subcategory associated with graphical object 1000-5 displayed along another viewing axis 1206 within GUI 900.

Exemplary options that may be represented by graphical objects 1202 include, but are not limited to, purchasing options, presentation options, recording options, access options, and/or any other option associated with one or more media content instances. Each graphical object 1202 may include content displayed therein that is representative of such options. For example, graphical objects 1202 may include any combination of images and text configured to represent one or more options associated with a graphical object (e.g., graphical object 1000-5) displayed within center focus portion 904.

An exemplary metadata subcategory that may be represented by graphical objects 1204 includes any of the metadata categories described herein. For example, graphical objects 1204 may represent metadata values within a media content instance title category, an album title category, a genre category, an artist category, and/or any other category associated with a plurality of media content instances. In the example of FIG. 12, graphical objects 1204 represent a plurality of chapters contained within a movie associated with graphical object 1000-5. Each graphical object 1204 may include content displayed therein that is representative of the particular metadata value associated therewith. For example, each graphical object 1204 may include any combination of images and text configured to represent a metadata value included within a metadata subcategory associated with graphical object 1000-5.

Figure 12:
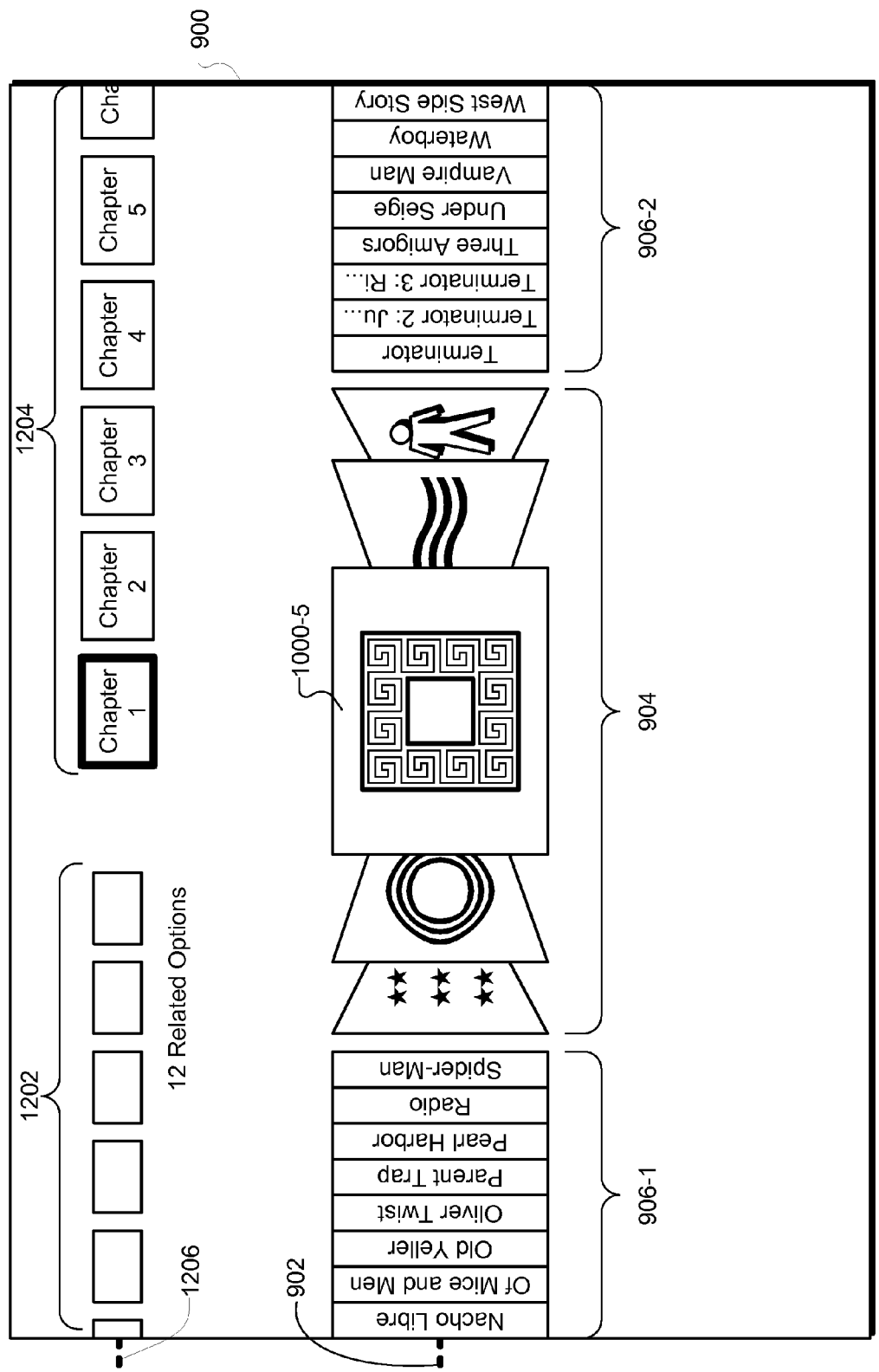
FIG. 12 shows a plurality of selectable graphical objects displayed along another viewing axis within the GUI of FIG. 9 according to principles described herein.

As shown in FIG. 12, viewing axis 1206 may be substantially parallel to viewing axis 902. Viewing axis 1206 may be alternatively positioned and/or oriented within GUI 900 as may serve a particular application. Moreover, it will be recognized that graphical objects 1202 and graphical objects 1204 are shown to be positioned along the same viewing axis 1206 for illustrative purposes only. It will be recognized that graphical objects 1202 and graphical objects 1204 may be alternatively positioned along separate viewing axes.

In some examples, graphical objects 1202 and/or graphical objects 1204 may be displayed automatically when a particular graphical object included within graphical objects 1000 is positioned within the center-most position of center focus portion 604. For example, graphical objects 1202 and/or graphical objects 1204 may be automatically displayed when graphical object 1000-5 enters the center-most position within center focus portion 604.

In some alternative examples, graphical objects 1202 and/or graphical objects 1204 may be displayed in response to a user input command. For example, a user may select up directional key 602-3 when graphical object 1000-5 is located within center focus portion 604 to display graphical objects 1202 and/or graphical objects 1204.

Figure 13:
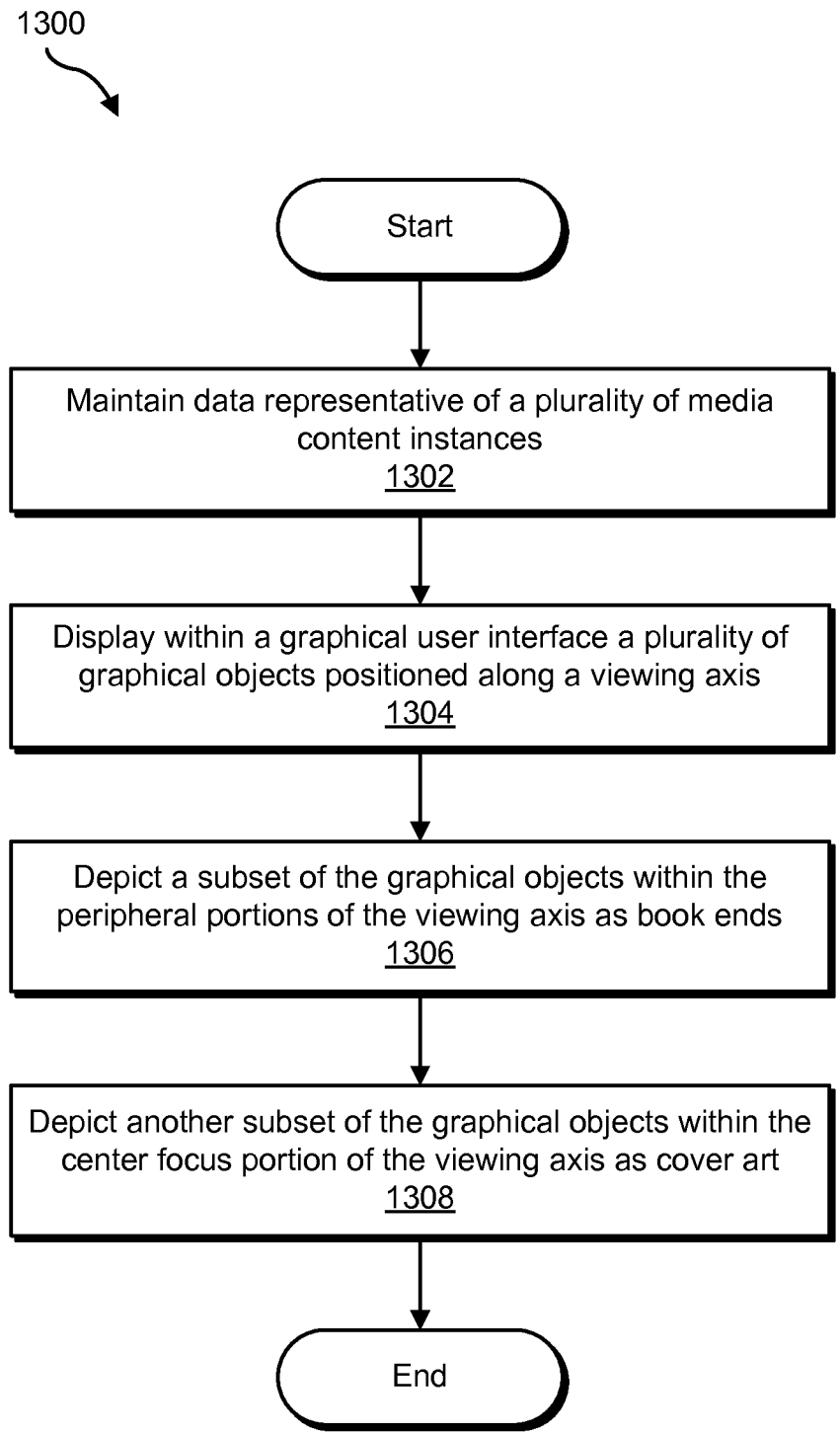
FIG. 13 illustrates another exemplary media content instance search method according to principles described herein.

FIG. 13 illustrates another exemplary media content instance search method 1300. While FIG. 13 illustrates exemplary steps according to one embodiment, other embodiments may omit, add to, reorder, and/or modify any of the steps shown in FIG. 13.

In step 1302, data representative of a plurality of media content instances is maintained. The data may be maintained in any of the ways described herein.

In step 1304, a plurality of graphical objects positioned along a viewing axis are displayed within a GUI that is presented to a user. The graphical objects may be displayed within the GUI in any of the ways described herein. Each graphical object represents a metadata value within a metadata category associated with the plurality of media content instances maintained in step 1302. The viewing axis includes a center focus portion disposed in between first and second peripheral portions.

In step 1306, a subset of the graphical objects are depicted within the peripheral portions of the viewing axis as book ends. The subset of graphical objects may be depicted as book ends in any of the ways described herein.

In step 1308, another subset of the graphical objects are depicted within the center focus portion of the viewing axis as cover art. The another subset of graphical objects may be depicted as cover art in any of the ways described herein.

As detailed above, the methods and systems described herein may facilitate efficient and effective searching within a plurality of media content instances. As an example, an exemplary method includes maintaining data representative of a plurality of media content instances, displaying within a graphical user interface a plurality of graphical objects positioned along a viewing axis, each of the graphical objects representing a metadata value within a metadata category associated with the media content instances, shifting a graphical object included within the plurality of graphical objects into a center focus portion of the viewing axis in response to a user input command, and transforming the graphical object from a book end depiction into a cover art depiction when the graphical object enters the center focus portion. The method may further include shifting the graphical object out of the center focus portion in response to another user input command and transforming the graphical object back into the book end depiction when the graphical object exits the center focus portion.

Another exemplary method includes maintaining data representative of a plurality of media content instances, displaying within a graphical user interface a plurality of graphical objects each representing a metadata value within a metadata category associated with the media content instances, the graphical objects being positioned along a viewing axis comprising a center focus portion disposed in between first and second peripheral portions, depicting a subset of the graphical objects within the peripheral portions of the viewing axis as book ends, and depicting another subset of the graphical objects within the center focus portion of the viewing axis as cover art. The method may further include shifting a graphical object included within the subset of graphical objects depicted within one of the peripheral portions into the center focus portion in response to a user input command and transforming the graphical object from a book end depiction into a cover art depiction when the graphical object enters the center focus portion.

An exemplary system includes a storage facility configured to maintain data representative of a plurality of media content instances and a display facility selectively and communicatively coupled to the storage facility. The display facility is configured to display within a graphical user interface a plurality of graphical objects positioned along a viewing axis, each of the graphical objects representing a metadata value within a metadata category associated with the media content instances, shift a graphical object included within the plurality of graphical objects into a center focus portion of the viewing axis in response to a user input command, and transform the graphical object from a book end depiction into a cover art depiction when the graphical object enters the center focus portion.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    maintaining data representative of a plurality of media content instances;
    displaying within a graphical user interface a plurality of graphical objects positioned along a first viewing axis, each of the graphical objects representing a metadata value within a metadata category associated with the media content instances;
    shifting a graphical object included within the plurality of graphical objects into a center focus portion of the first viewing axis in response to a user input command;
    transforming the graphical object from a book end depiction that is visually similar to a spine of a media content housing associated with a metadata value represented by the graphical object into a cover art depiction that is visually similar to a front cover of the media content housing when the graphical object enters the center focus portion;
    displaying, concurrently with the plurality of graphical objects positioned along the first viewing axis, a plurality of selectable graphical objects positioned along a second viewing axis within the graphical user interface, each of the selectable graphical objects being associated with the graphical object positioned within the center focus portion and representing a metadata value within a subcategory of the metadata category; and
    displaying, concurrently with the plurality of graphical objects positioned along the first viewing axis and the plurality of graphical objects positioned along the second axis, another plurality of selectable graphical objects positioned along the second viewing axis, each selectable graphical object included in the another plurality of selectable graphical objects being associated with the graphical object positioned within the center focus portion and representing a plurality of options associated with the graphical object.

2. The method of claim 1, further comprising:
    shifting the graphical object out of the center focus portion in response to another user input command; and
    transforming the graphical object back into the book end depiction when the graphical object exits the center focus portion.

3. The method of claim 1, wherein the selectable graphical objects positioned along the second viewing axis are displayed in response to another user input command.

4. The method of claim 1, wherein the metadata category comprises a movie category and wherein the subcategory comprises a chapter category within the movie category.

5. The method of claim 1, further comprising:
    shifting another graphical object included within the plurality of graphical objects into the center focus portion of the first viewing axis in response to another user input command; and
    transforming the another graphical object from a book end depiction into a cover art depiction when the another graphical object enters the center focus portion;
    wherein the graphical object and the another graphical object are configured to be concurrently located within the center focus portion.

6. The method of claim 1, further comprising presenting a media content instance associated with the graphical object in response to another user input command.

7. The method of claim 1, wherein each graphical object within the plurality of graphical objects represents a title of a movie within a collection of movies.

8. The method of claim 1, tangibly embodied as computer-executable instructions on at least one non-transitory computer-readable medium.

9. The method of claim 1, wherein the book end depiction includes graphical content representative of the metadata value within the metadata category visually displayed along the spine of the media content housing and wherein the cover art depiction includes different graphical content representative of the metadata value within the metadata category visually displayed along the front cover of the media content housing.

10. The method of claim 1, wherein the graphical objects positioned along the second viewing axis are displayed automatically when the graphical object is shifted into the center focus portion of the first viewing axis.

11. The method of claim 1, wherein the graphical object shifted into the center focus portion includes graphical content representative of the metadata value within the metadata category and wherein each graphical object positioned along the second viewing axis includes graphical content representative of the corresponding metadata value within the corresponding subcategory of the metadata category.

12. A method comprising:
    maintaining data representative of a plurality of media content instances;
    displaying within a graphical user interface a plurality of graphical objects each representing a metadata value within a metadata category associated with the media content instances, the graphical objects being positioned along a first viewing axis comprising a center focus portion disposed in between first and second peripheral portions;
    depicting a subset of the graphical objects within the peripheral portions of the first viewing axis as book ends that are visually similar to spines of media content housings associated with metadata values represented by the subset of the graphical objects;
    depicting another subset of the graphical objects within the center focus portion of the first viewing axis as cover art depictions that are visually similar to front covers of media content housings associated with metadata values represented by the another subset of the graphical objects;
    displaying, concurrently with the plurality of graphical objects positioned along the first viewing axis, a plurality of selectable graphical objects each representing a metadata value within a subcategory of the metadata category and being associated with a graphical object included in the another subset of graphical objects depicted within the center focus portion, the graphical objects being positioned along a second viewing axis within the graphical user interface; and displaying, concurrently with the plurality of graphical objects positioned along the first viewing axis and the plurality of graphical objects positioned along the second axis, another plurality of selectable graphical objects positioned along the second viewing axis, each selectable graphical object included in the another plurality of selectable graphical objects being associated with a graphical object included within the subset of graphical objects depicted within the center focus portion and representing a plurality of options associated with the graphical object.

13. The method of claim 12, further comprising:

shifting a graphical object included within the subset of graphical objects depicted within one of the peripheral portions into the center focus portion in response to a user input command; and transforming the graphical object from a book end depiction into a cover art depiction when the graphical object enters the center focus portion.

14. The method of claim 12, further comprising:

shifting a graphical object included within the subset of graphical objects depicted within the center focus portion into one of the peripheral portions in response to a user input command; and transforming the graphical object from a cover art depiction into a book end depiction when the graphical object enters the one of the peripheral portions.

15. The method of claim 12, wherein the selectable graphical objects positioned along the second viewing axis are displayed in response to another user input command.

16. The method of claim 12, further comprising presenting a media content instance associated with the graphical object in response to another user input command.

17. The method of claim 12, wherein each graphical object within the plurality of graphical objects represents a title of a movie within a collection of movies.

18. A system comprising:

at least one physical computing device that comprises
a storage facility that maintains data representative of a plurality of media content instances; and
a display facility selectively and communicatively coupled to the storage facility and that
displays within a graphical user interface a plurality of graphical objects positioned along a first viewing axis, each of the graphical objects representing a metadata value within a metadata category associated with the media content instances,
shifts a graphical object included within the plurality of graphical objects into a center focus portion of the first viewing axis in response to a user input command,
transforms the graphical object from a book end depiction that is visually similar to a spine of a media content housing associated with the metadata value into a cover art depiction that is visually similar to a front cover of the media content housing when the graphical object enters the center focus portion,
displays, concurrently with the plurality of graphical objects positioned along the first viewing axis, a plurality of selectable graphical objects positioned along a second viewing axis within the graphical user interface, each of the selectable graphical objects being associated with the graphical object positioned within the center focus portion and representing a metadata value within a subcategory of the metadata category, and
displays, concurrently with the plurality of graphical objects positioned along the first viewing axis and the plurality of graphical objects positioned along the second axis, another plurality of selectable graphical objects positioned along the second viewing axis, each selectable graphical object included in the another plurality of selectable graphical objects being associated with the graphical object positioned within the center focus portion and representing a plurality of options associated with the graphical object.

19. The system of claim 18, wherein the display facility is further configured to:

shift the graphical object out of the center focus portion in response to another user input command; and transform the graphical object back into the book end depiction when the graphical object exits the center focus portion.

20. The system of claim 18, wherein the display facility is further configured to:

shift another graphical object included within the plurality of graphical objects into the center focus portion of the first viewing axis in response to another user input command; and transform the another graphical object from a book end depiction into a cover art depiction when the another graphical object enters the center focus portion;

wherein the graphical object and the another graphical object are configured to be concurrently located within the center focus portion.

21. The system of claim 18, wherein the display facility is further configured to automatically display the graphical objects positioned along the second viewing axis upon shifting the graphical object into the center focus portion of the first viewing axis.

* * * * *